April 5, 1960 A. M. SMITH 2,931,148
METHOD OF WRAPPING TACKY POLYMER AS SHIPPING
PACKAGE AND APPARATUS THEREFOR
Filed June 10, 1957 3 Sheets-Sheet 1

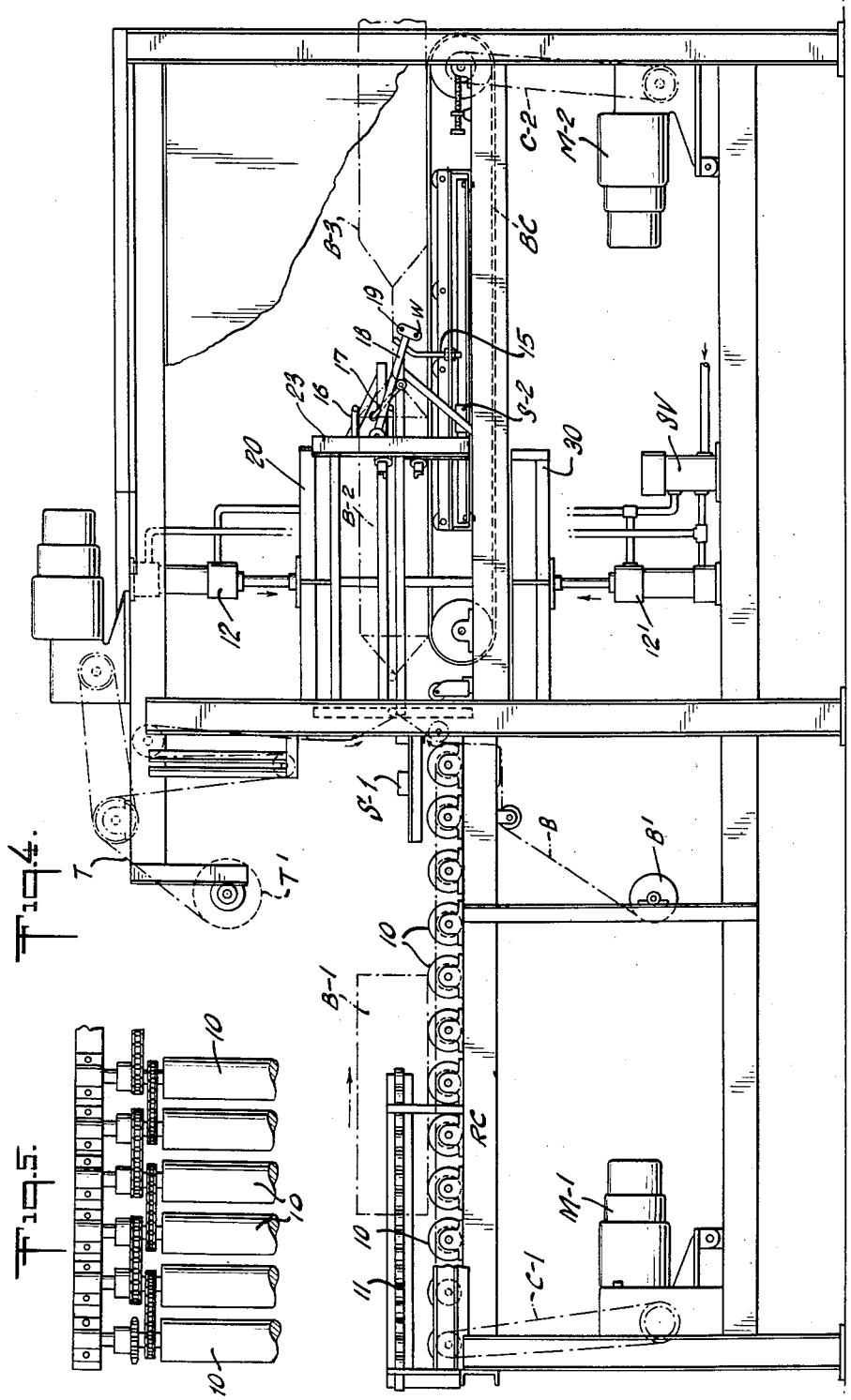

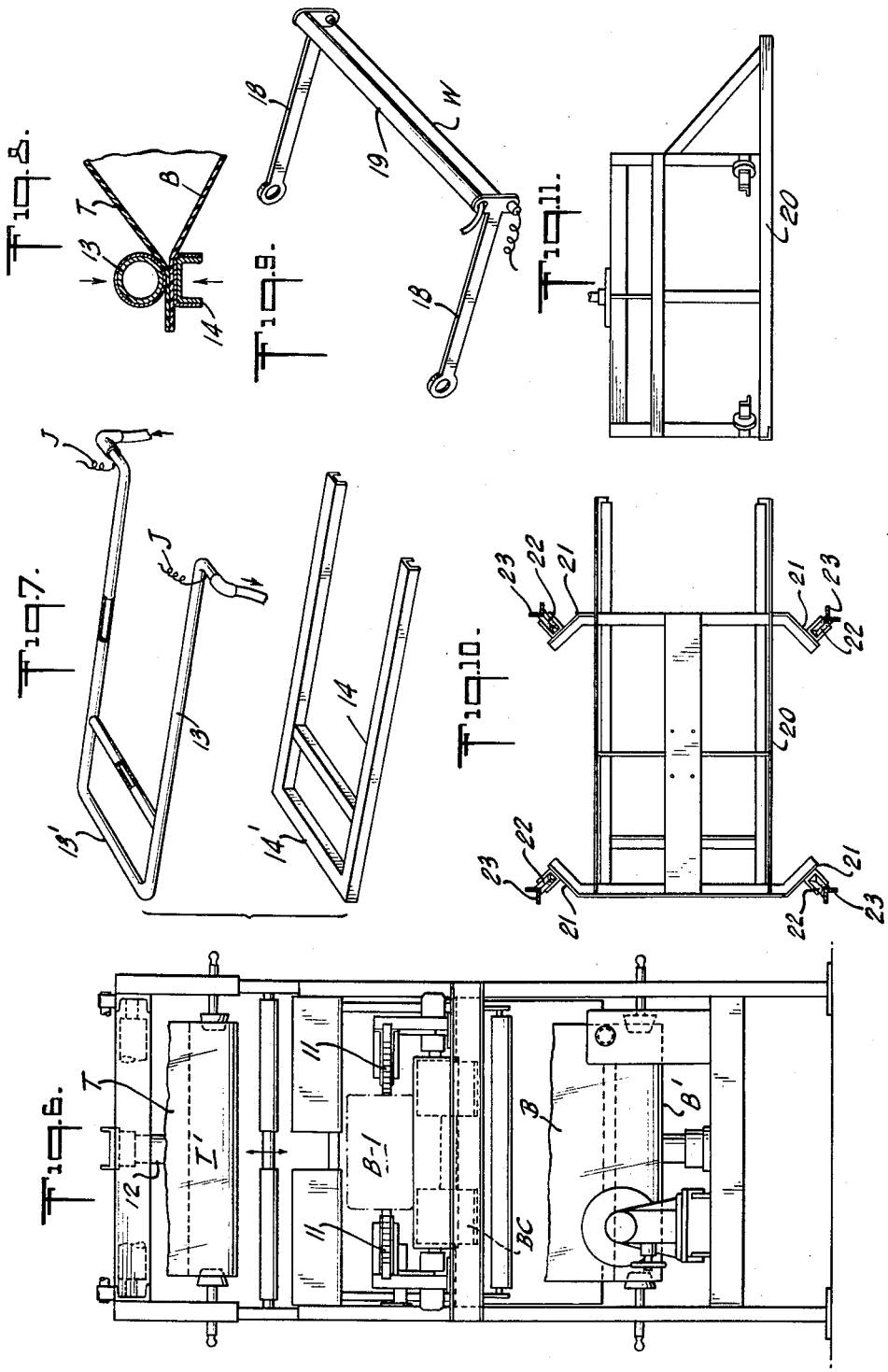

United States Patent Office 2,931,148
Patented Apr. 5, 1960

2,931,148

METHOD OF WRAPPING TACKY POLYMER AS SHIPPING PACKAGE AND APPARATUS THEREFOR

Andrew M. Smith, Port Neches, Tex., assignor to Texas-U.S. Chemical Company, New York, N.Y., a corporation of Delaware Application June 10, 1957, Serial No. 664,575

7 Claims. (Cl. 53—28)

This invention relates generally to the wrapping of a tacky polymer and specifically to a method and an apparatus for the provision of a package of a tacky polymer having cold-flow characteristics in a loosely wrapped envelope of a thermoplastic material for effective shipment and storage.

In the manufacture of synthetic rubber, which is such a tacky polymer, bales of approximately 75 pounds in weight and having dimensions of about 7" x 14" x 28" are produced for further commercial utilization. Shipment of these bales is made in large cardboard cartons, each of which holds 33 bales disposed in 11 layers of 3 bales each. The raw or unprocessed rubber tends to flow under package pressure and, when exposed, to adhere to the inside of the carton and particularly to other bales, so that each bale must be wrapped in some material which will prevent adhesion to adjoining surfaces. For this purpose a wrapper of a thermoplastic material such as polyethylene has been found most advantageous. So that there may be free movement between the bales wrapped with polyethylene film at all points of contact, the outside surfaces of the wrapped bales are dusted freely with talc. Although the rubber adheres to the polyethylene film, no attempt is made to strip the film from the wrapped bale when the raw rubber is processed further, since both are compatible in mixing and end use.

In the prior art, the method of packaging as well as the shipment and storage package of the wrapped raw rubber were not satisfactory because the film wrapping was too tight and left no room for the movement of rubber. The package was sealed only on the ends and there was a tendency, under extreme conditions, for the rubber to ooze out of the package through the opening where the film wrapping overlapped (on either the top or bottom surface), when the pressure was great enough and there was sufficient time. And even when the package did not leak, through the overlap opening, the wrapping film ruptured under cold-flow, leading to adhesion between the bales as well as to the enclosing carton.

By the present invention, it is proposed to anticipate the cold-flow process by packaging a tacky polymer, such as raw synthetic rubber, in a thermoplastic film having sufficient space on all sides in the resulting receptacle for plastic movement of the rubber without breaking the enclosing film.

Accordingly, it is an object of this invention to provide an improved package of a synthetic rubber wrapped in an envelope of polyethylene.

It is another object of this invention to provide an improved package for the shipment as well as the storage of a synthetic rubber in a loose wrapping of a film of a thermoplastic material.

Still another object of this invention is to provide an improved method by which a package of tacky material of high polymer content may be prepared for shipment.

Another object of this invention is to provide a method by which a tacky polymer may be loosely wrapped in an envelope of polyethylene.

Still another object of this invention is to provide a novel apparatus by which a high polymer count tacky material may be packaged loosely yet be sealed completely in an envelope of polyethylene.

And another object of this invention is to provide an apparatus by which a loosely wrapped package of a tacky polymer in a film of polyethylene may be made.

These and other objects and advantages of the invention will be apparent from a reading of the specification when taken in conjunction with the drawings wherein:

Fig. 4 is a side elevation of the apparatus which produces a loosely wrapped bale of synthetic rubber;

Fig. 5 is a partial plan of the incoming end of the apparatus of Fig. 4, showing the motor driven rolls of the conveyor;

Fig. 6 is an end view of the apparatus of Fig. 4;

Fig. 7 is a schematic of the heating means and associated backing member;

Fig. 8 is an enlarged detail showing the heat sealing of the film layers;

Fig. 9 shows the basic elements of the means for separating the packaged bales;

Fig. 10 is a plan view of the upper jaw frame which supports the heating means; and Fig. 11 is a side view of the upper jaw frame of Fig. 10.

The objects of this invention can be achieved by use of an apparatus which joins parallel sheets of a thermoplastic material to enclose completely and loosely a tacky material of high polymer count, by a novel means of sealing the sheets together on all sides of the resulting package.

Figure 1:
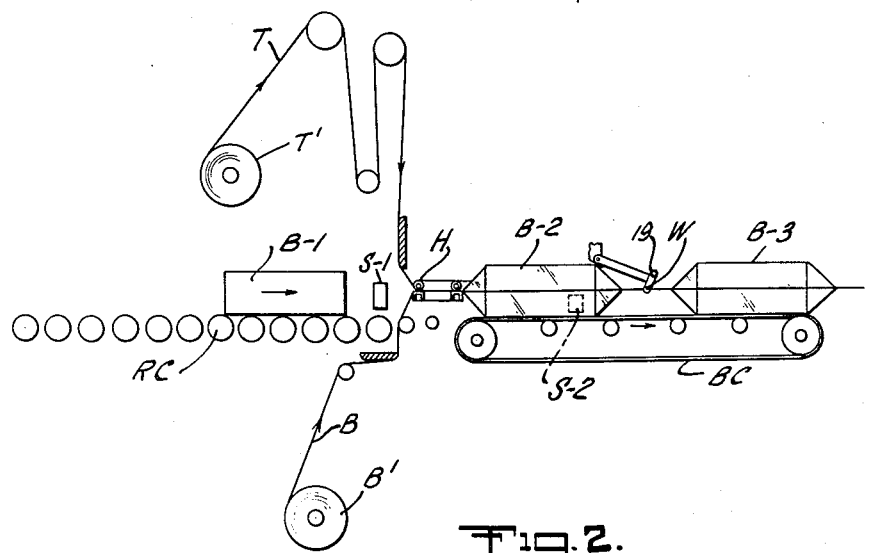
Fig. 1 is a schematic view of a side elevation of the apparatus which produces a package of tacky material loosely wrapped in a polyethylene film.

Referring to Fig. 1, there is disclosed schematically an apparatus for packaging bales of synthetic rubber. A bale, such as indicated at B–1, dropping from the bale press and passing along a conveyor system, reaches the rollers of the motor driven roller conveyor, RC, of the bale wrapper, and moves therealong to contact a first switch, indicated at S–1. After contact is made, the belt conveyor at BC is actuated to move the bale into position (shown as B–2) for the sealing of the top and bottom sheets or films of polyethylene, indicated as T and B respectively. This position of the bale is determined when the bale contacts a second switch, indicated at S–2, which stops the movement of both the roller and belt conveyors. A time-cycle controller (not shown in this figure), then regulates the sealing operation and mechanism. This brings the heating means and backing member together to seal the two sides and the upstream end of the envelope (enclosing B–2) and completes the package, since the downstream end had been sealed in the previous cycle. This operation can be seen where the downstream end of the envelope for the bale B–1 is being sealed at H, while the envelope containing B–2 is being sealed along its sides and upstream end. At the same time, a hot cutting wire at W, makes contact with the double thickness of polyethylene film to cut free the previously packaged bale B–3. At the end of the heating cycle, the sealing device returns to open position, and the power circuits are energized for actuating the roller and belt conveyors, RC and BC. If no bale has yet reached the roller conveyor, the sealed envelope containing the bale B–2 remains in position joined to the sheets of polyethylene. This bale may be removed manually, if desired, by cutting it free, and more usually, it is moved automatically when the first switch S–1 is contacted to actuate the belt conveyor, which moves the completed package containing B-2 into the space now indicated as occupied by B-3.

Figure 2:
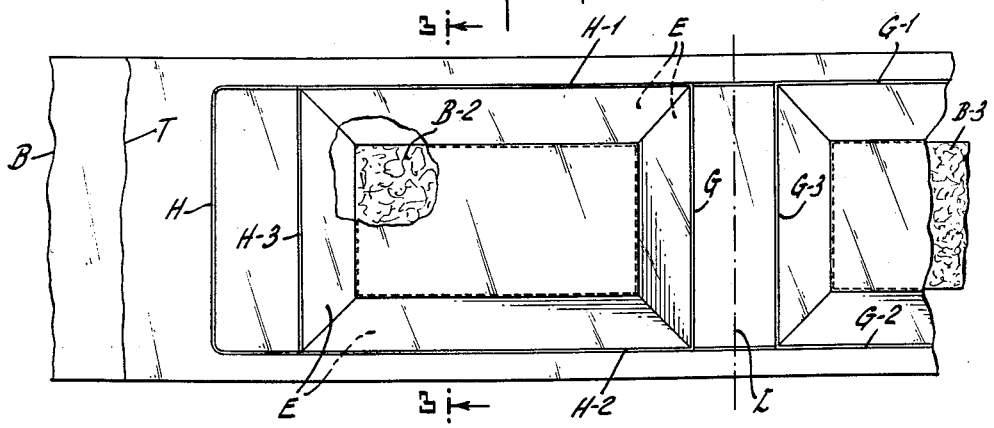
Fig. 2 is a top view, partly in section, of part of a series of completed packages.
Figure 3:
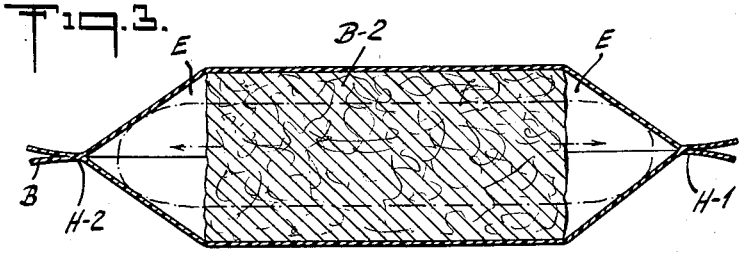
Fig. 3 is a cross section taken along the line 3—3 in Fig. 2.

Figs. 2 and 3 show the packages containing the bales of synthetic rubber B-2 and B-3. The line of the cut through the top and bottom sheets is indicated at L, and the heat sealed or fusion lines occurring during the process, as shown in Fig. 1, being indicated at H and at H-1, H-2, and H-3, with the heat sealed lines of the previous cycle being indicated at G, G-1, G-2 and G-3.

The dotted outline of the bale B-2 in Fig. 3 shows the position of the bale after cold flow has occurred, indicating how the loosely wrapped envelope of polyethylene film has been able to overcome the disadvantages of the close fitting film packaging of the prior art, by occupying the space at E, Figs. 2 and 3.

Referring now to Figs. 4 and 5, when a bale, as indicated in dotted form at B-1, drops from the bale press, it moves to the bale wrapper by gravity along a roll-type conveyor, onto the motor driven roller conveyor RC, the rollers of which are indicated at 10, and between the side guides, one of which is indicated at 11. The rollers are driven by a motor at M-1 through the chain drive C-1 and have overriding clutches, so that an oncoming bale moves well onto the roller conveyor before it ceases to move under the force of gravity. These rollers are in movement at all times except during the actual sealing operation of the package. The bale moves along the roller conveyor and eventually makes contact with the switch at S-1. When this contact is made, the motor at M-2 is started and this drives the belt conveyor, BC, through the chain drive at C-2 and moves the bale in position for sealing at B-2. This position of the bale, for sealing between the parallel sheets of polyethylene to form a package, is determined by contact made with a second switch, the bottom part of which is indicated at S-2. When contact is made with this latter switch, both motors M-1 and M-2 are stopped and the bale is centered for the sealing operation, positioned between top and bottom sheets of polyethylene. These sheets are indicated respectively at T and B and are guided over conventional rollers and surfaces as they feed off the supply rolls, indicated at T' and B' respectively.

With the stopping of the motors M-1 and M-2, a time cycle controller (not shown) regulates each phase of the sealing operation starting as follows. A solenoid valve at S—V is actuated, putting air pressure on the upper and lower air cylinders or rams, indicated at 12 and 12' respectively, to move the upper and lower frames, 20 and 30, carrying the sealing means, together. These means, supported by the jaw frames, comprise the upper part of an unbalanced H-shaped heating member 13, Fig. 7, with legs connected at one end thereof, as indicated at 13'. In practice, this heating member consists of ¼" stainless steel tubing, with heating by induction, current being supplied through the circuit indicated partly at J—J. Cooling water flows through the tubing at all times except during the heating cycle, the arrows indicating the flow direction of the coolant. The lower part of the sealing means supported by the lower frame 30 is of complementary construction, 14 and 14', and comprises a backing member or pressure bar against which the two sheets of polyethylene are held in position by the heating member during the sealing operation. Both the heating and backing members are coated slightly with a silicone polymer to prevent adherence of the melted polyethylene.

During the sealing operation, a heated cutting wire disclosed at W, on the end of the film cutter assembly of Fig. 9 makes contact with the polyethylene sheets or films between the bale (B-2) being sealed in the machine and the bale (B-3) which is riding on the belt conveyor immediately downstream to effect separation between them. This cutting is aided by a pair of oppositely disposed film guides, one of which is shown at 15. The limits of the upward and downward movements of the film cutter assembly are controlled by the stops or limit bars at 16 as the assembly is moved by the position rods mounted on the upper frame, one of which is shown at 17.

The film cutter assembly of Fig. 9 comprises a pair of legs 18—18 adapted to be pivot mounted to the top frame and interconnected by the support member 19, spacing the heated cutting wire W between them.

The heat sealing cycle is as follows:

(a) Heat is applied to the heating means for 1½ seconds, with induction heating used.

(b) The heating means and the lower pressure or backing member are maintained in contact with the parallel sheets of polyethylene between them for an additional three seconds, during which the heating means cools off and the lines of fusion of the two polyethylene sheets also cool off. This is accomplished by circulating water through the heating tubing, the flow being stopped during the heating period and resumed immediately following.

(c) At the end of these 4½ seconds, the pressure in the air cylinders is released and the sealing means, composed of the upper and lower jaw frames, returns to open position, ready for action upon the next contact of a bale with the switch at S-2. The power circuits are then re-energized, with the motor M-1 driving the rollers of the roller conveyor RC, and motor M-2 ready to drive the belt conveyor BC, as soon as another bale makes contact with the switch at S-1.

Figs. 10 and 11 indicate the plan and elevation views of the upper jaw frame, 20, which supports in insulated relationship the heating means or tubing 13, 13'. The structural members of this jaw frame consist of angles and channels of conventional construction. The frame supports the guide wheel assemblies at 21 in the movement caused by the action of the air cylinders or pneumatic rams. The guide wheels at 22 contact appropriately disposed corner angle members, indicated as the jaw frame guides at 23 mounted on the bale wrapper.

The lower jaw frame member has a similar construction and to prevent repetition, consequently is not disclosed herein.

Thus, it should be evident that an improved package of a tacky material in a loose wrapper of polyethylene has been obtained by an improved method and apparatus, and that the article produced overcomes the disadvantages of the prior art construction and avoids the problem of adhesion of raw synthetic rubber which has cold-flowed from a ruptured package. The apparatus produces such an effective seal of the parallel sheets of polyethylene that the occluded air cannot escape until sufficient pressure is exerted to rupture the seal or film. On occasion, a deliberate vent has been made and also consideration given to form a defective spot in the line of fusion by the insertion of insulating means. There is no rubber flow out through the vent because of the adequate space in the loosely wrapped package. The improved method allows for completion of the package while at the same time, a previously completed package is cut free.

Obviously, many modifications and variations of the invention, as hereinbefore set forth, may be made without departing from the spirit and scope thereof, and therefore only such limitations should be imposed as are indicated in the appended claims.

I claim:

1. In a method for the continuous packaging of bales of tacky material such as synthetic rubber, the steps comprising the positioning of a bale of such tacky material midway between substantially parallel sheets of a thermoplastic material such as polyethylene, and sealing said tacky material within said sheets of polyethylene thereby to form a package in the shape of a loose fitting envelope for the same, said sheets of polyethylene being sealed along the downstream edge of said envelope prior to the positioning of said bale between said sheets, said loose fitting envelope being completed by heat sealing along the upstream edge and along both sides thereof and at a distance from said bale therewithin, and concurrently therewith, sealing the downstream edge of the immediately following envelope and severing the immediately preceding package.

2. In a method for packaging a bale of synthetic rubber loosely in an envelope of polyethylene film, the steps of positioning a bale of said rubber midway between two sheets of polyethylene in which the downstream edge of the envelope has been formed previously, bringing the free edge portions of the sheets of polyethylene film together to form a loose package about said bale, fusing said sheets together by the application of induction heating to said free edge portions at a spaced distance from said bale therebetween and immediately thereafter cooling the same thereby to form a loose fitting sealed package for said bale of synthetic rubber, and concurrently severing the sheets of polyethylene film adjacent the upstream edge of the immediately preceding packaged bale of rubber and sealing the downstream edge of the envelope for the immediately following bale of synthetic rubber to be packaged.

3. An apparatus for loosely wrapping bales of synthetic rubber in thermoplastic material comprising means for continuously positioning single bales of synthetic rubber midway between two oppositely disposed sheets of thermoplastic material, such as polyethylene, means for heat sealing said sheets on all sides of said bale after bringing edge portions of said sheets in contact relationship spaced from the sides and edges of said bale thereby enclosing said bale loosely in an envelope of polyethylene, and means for cutting said sheets of thermoplastic material between the downstream edge of said envelope and the upstream edge of the envelope of the immediately preceding wrapped bale to separate the wrapped bale from the two sheets of polyethylene, said heat sealing and said cutting occurring substantially simultaneously.

4. A bale wrapper apparatus for loosely packaging a bale of synthetic rubber between two substantially parallel sheets of thermoplastic material to form an envelope for said bale, comprising a first means for conveying said bale along said bale wrapper apparatus, a second means for conveying said bale further into position between said sheets of thermoplastic material, a first means for contact by the moving bale to actuate said second means for conveying, a second means for contact by the moving bale to suspend the actuation of said first and said second means for conveying and thereby to locate said bale midway between said sheets of thermoplastic material for formation of the envelope therefor, means for heat sealing the two sides and the upstream edge of the thermoplastic envelope for said bale and the downstream edge of the envelope for the immediately succeeding bale, and means for separating said bale thus packaged in said thermoplastic envelope from the preceding packaged bale downstream of the leading edge of the sealed envelope thereof, the separating occurring substantially simultaneously with the heat sealing.

5. An apparatus for providing a package of a tacky polymer having cold flow characteristics loosely wrapped in an envelope of a thermoplastic material such as polyethylene comprising a bale wrapper having a first and a second conveying means, and a first and a second contact switching means respectively for actuating said second conveying means and for stopping the movement of said first and second conveying means, said first contact switching means being activated when a bale of tacky polymer, such as synthetic rubber, is brought into contact therewith thereby to actuate said second conveying means to position said bale midway between opposing sheets of polyethylene, said second contact means when contacted by said bale stopping the movement of both of said conveying means and leaving said bale in position for the enclosure thereof in a loose envelope of polyethylene, and actuating heat sealing means comprising a heating means and a backing means for retaining said sheets of polyethylene therebetween while the heat seal is fused and cooled and then returned to open position ready for the succeeding sealing cycle, and means for severing the immediately preceding completed package from said sheets of polyethylene, acting substantially simultaneously with said heat sealing means.

6. For producing a loosely wrapped package containing a tacky polymer in a polyethylene envelope by the method described, apparatus therefor comprising means for positioning said tacky polymer, consisting of a bale of synthetic rubber, midway between parallel sheets of a thermoplastic material such as polyethylene, said means comprising a pair of spaced conveying means and a pair of contact switching means for control of the actuation of said conveying means, the first of said pair of contact switching means being activated by contact with said bale being moved by the first of said pair of conveying means to actuate the second of said pair of conveying means, the second of said pair of switching means being activated by said bale moved in contact therewith by the second of said pair of conveying means thereby to stop the further actuation of said pair of spaced conveying means and thereby locate said bale in position to be sealed within said envelope of polyethylene, means for heat sealing by successive fusion and cooling of said sheets of polyethylene, to form an envelope for said bale comprising reciprocable means supporting complementary heating and cooling and backing members for retaining said sheets of polyethylene therebetween, the heating and cooling member being adapted to provide heating by induction and cooling at all other times than during the heating cycle, means for applying pressure to said reciprocable means to maintain said sheets of polyethylene in position during the fusion and cooling stages of the heat sealing cycle, said heating and backing members being coated with a synthetic material which is incompatible with said sheets of polyethylene to prevent adhesion therewith, and means operating concurrently with said heat sealing cycle supported by said reciprocable means for severing an immediately preceding packaged bale from said sheets, the heat sealing completing the envelope by fusion of the upstream end and the two sides thereof and the downstream end of the immediately following envelope.

7. In the apparatus as defined in claim 6, said means for heat sealing providing for a vent for said envelope thereby preventing rupture thereof by occluded air as the package is subjected to increased pressure, said heating and backing members contacting said sheets of polyethylene along the edge portions thereof and spaced from the sides and the ends of said bale thereby to form a loosely wrapped envelope therefor, thereby allowing adequate room for the cold flow of said synthetic rubber during transport and storage without bursting said envelope.

References Cited in the file of this patent

UNITED STATES PATENTS

| | | |
|---|---|---|
| 2,162,230 | Salfisberg | June 13, 1939 |
| 2,420,983 | Salfisberg | May 20, 1947 |
| 2,469,975 | McCloy | May 10, 1949 |
| 2,486,758 | Pfeiffer | Nov. 1, 1949 |
| 2,568,794 | Dieter | Sept. 25, 1951 |
| 2,633,280 | Davies | Mar. 3, 1953 |
| 2,639,567 | Murdoch | May 26, 1953 |
| 2,639,808 | Barry et al. | May 26, 1953 |
| 2,648,487 | Linda | Aug. 11, 1953 |
| 2,749,687 | Imbs | June 12, 1956 |
| 2,762,504 | Sparks et al. | Sept. 11, 1956 |
| 2,766,571 | Bryce | Oct. 16, 1956 |
| 2,836,943 | Davis | June 3, 1958 |

OTHER REFERENCES

"Dow Corning Silicone Products," 1952–53, Dow Corning Corp., Midland, Mich., form No. 1–100–100M–852.